United States Patent
Yoshida et al.

(10) Patent No.: US 10,763,763 B2
(45) Date of Patent: Sep. 1, 2020

(54) MOTOR AND ELECTRONIC APPARATUS INCLUDING MOTOR

(71) Applicant: CANON KABUSHIKI KAISHA, Tokyo (JP)

(72) Inventors: Shinsuke Yoshida, Tokyo (JP); Yasufumi Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 704 days.

(21) Appl. No.: 15/496,754

(22) Filed: Apr. 25, 2017

(65) Prior Publication Data

US 2017/0317613 A1 Nov. 2, 2017

(30) Foreign Application Priority Data

Apr. 28, 2016 (JP) .................................. 2016-090598
Oct. 7, 2016 (JP) .................................. 2016-199106

(51) Int. Cl.
*H01L 41/09* (2006.01)
*H02N 2/02* (2006.01)
(Continued)

(52) U.S. Cl.
CPC ............. *H02N 2/026* (2013.01); *H02N 2/006* (2013.01); *H02N 2/0055* (2013.01); *H02N 2/04* (2013.01)

(58) Field of Classification Search
CPC ...... H02N 2/026; H02N 2/0055; H02N 2/006; H02N 2/04
(Continued)

(56) References Cited

U.S. PATENT DOCUMENTS

| 2014/0293463 A1 | 10/2014 | Yamanaka |
| 2015/0200610 A1 | 7/2015 | Yamasaki |

(Continued)

FOREIGN PATENT DOCUMENTS

| CN | 104104265 A | 10/2014 |
| CN | 104753390 A | 7/2015 |

(Continued)

OTHER PUBLICATIONS

The above documents were cited in a European Search Report dated Sep. 26, 2017, which is enclosed, that issued in the corresponding European Patent Application No. 17168103.4.
(Continued)

*Primary Examiner* — Thomas A Dougherty
(74) *Attorney, Agent, or Firm* — Cowan, Liebowitz & Latman, P.C.

(57) ABSTRACT

A motor includes a pressing member pressing a vibrator onto a contacting member, first and second holding members respectively holding the vibrator and a transmission member, which transmits pressing force by the pressing member to the vibrator, and a coupling member coupling the first and second holding members. The vibrator and the contacting member move by vibrations occurring in the vibrator. The coupling member includes a rolling member moving the first and second holding members in a pressing direction of the pressing member, and an urging member, which is held by the second holding member, urging the first and second holding members in parallel with a moving direction of the vibrator and the contacting member. The rolling member is sandwiched between the first and second holding members, and abuts against the first holding member on a center side of the vibrator in the moving direction.

18 Claims, 6 Drawing Sheets

(51) Int. Cl.
*H02N 2/04* (2006.01)
*H02N 2/00* (2006.01)

(58) Field of Classification Search
USPC .......................................... 310/311–371, 800
See application file for complete search history.

(56) References Cited

U.S. PATENT DOCUMENTS

2017/0038554 A1    2/2017  Nakashita
2017/0317614 A1*  11/2017  Shiono ................ H04L 27/2656

FOREIGN PATENT DOCUMENTS

| EP | 2889997 A1 | 7/2015 |
|---|---|---|
| JP | 2015-126692 A | 7/2015 |
| JP | 2015-220911 A | 12/2015 |
| JP | 2016-059121 A | 4/2016 |
| JP | 5969976 B2 | 8/2016 |
| JP | 2015-220911 B2 | 5/2018 |
| JP | 6324208 B2 | 5/2018 |

OTHER PUBLICATIONS

The above foreign patent documents were cited in a Jan. 2, 2019 Chinese Office Action, which is enclosed with an English Translation, that issued in Chinese Patent Application No. 201710288258.X.

The above foreign patent document was cited in a Feb. 25, 2020 Japanese Office Action, which is enclosed with an English Translation, that issued in Japanese Patent Application No. 2016090598. The above patent document was cited in a European Communication dated Oct. 18, 2019, which is enclosed, that issued in the corresponding European Patent Application No. 17168103.4.

\* cited by examiner

MOTOR AND ELECTRONIC APPARATUS INCLUDING MOTOR

BACKGROUND OF THE INVENTION

Field of the Invention

The present invention relates to a motor including a vibrator.

Description of the Related Art

A vibration-wave motor (ultrasonic motor) widely used as a driving source of a camera and a lens by utilizing characteristics, such as output of high torque, high positioning accuracy and silence, is expected to achieve both improvement of driving efficiency and miniaturization. To improve driving efficiency, Japanese Patent Laid-Open No. 2015-126692 discloses an ultrasonic motor including a coupling member that couples a vibrator holding member fixing an ultrasonic vibrator and a pressing mechanism holding member without any backlash in a moving direction to be movable in a pressing direction.

However, the ultrasonic motor disclosed in Japanese Patent Laid-Open No. 2015-126692 can improve the driving efficiency, but its external size in a plane view expands due to a rolling member included in the coupling member and a leaf spring, and thus miniaturization is difficult. Moreover, the ultrasonic motor disclosed in Japanese Patent Laid-Open No. 2015-126692 requires both a stopping structure to prevent fall of the rolling ball and a stopping structure to prevent fall of the two holding members, thus enlarging as a whole.

SUMMARY OF THE INVENTION

In view of the problem, an object of the present invention is to provide a motor and an electronic apparatus capable of realizing both improvement of driving efficiency and miniaturization.

A motor according to one aspect of the present invention includes a vibrator, a pressing member that presses the vibrator onto a contacting member in contact with the vibrator, a transmission member that transmits pressing force by the pressing member to the vibrator, a first holding member that holds the vibrator, a second holding member that holds the transmission member, and a coupling member that couples the first and second holding members. The vibrator and the contacting member move relatively by vibrations that occur in the vibrator. The coupling member includes a rolling member that relatively moves the first and second holding members in a pressing direction of the pressing member, and an urging member that urges the first and second holding members in parallel with a relative moving direction of the vibrator and the contacting member. The urging member is held by the second holding member. The rolling member is sandwiched between the first and second holding members, and abuts against the first holding member on a center side of the vibrator in the relative moving direction of the vibrator and the contacting member.

An electronic apparatus according to another aspect of the present invention includes a motor. The motor includes a vibrator, a pressing member that presses the vibrator onto a contacting member in contact with the vibrator, a transmission member that transmits pressing force by the pressing member to the vibrator, a first holding member that holds the vibrator, a second holding member that holds the transmission member, and a coupling member that couples the first and second holding members. The vibrator and the contacting member move relatively by vibrations that occur in the vibrator. The coupling member includes a rolling member that relatively moves the first and second holding members in a pressing direction of the pressing member, and an urging member that urges the first and second holding members in parallel with a relative moving direction of the vibrator and the contacting member. The urging member is held by the second holding member. The rolling member is sandwiched between the first and second holding members, and abuts against the first holding member on a center side of the vibrator in the relative moving direction of the vibrator and the contacting member.

Further features of the present invention will become apparent from the following description of exemplary embodiments with reference to the attached drawings.

DESCRIPTION OF THE PREFERRED EMBODIMENTS

Referring now to the accompanying drawings, a detailed description will be given of embodiments of the present invention. Those elements in each figure, which are corresponding elements, will be designated by the same reference numerals, and a description thereof will be omitted.

Figure 1:
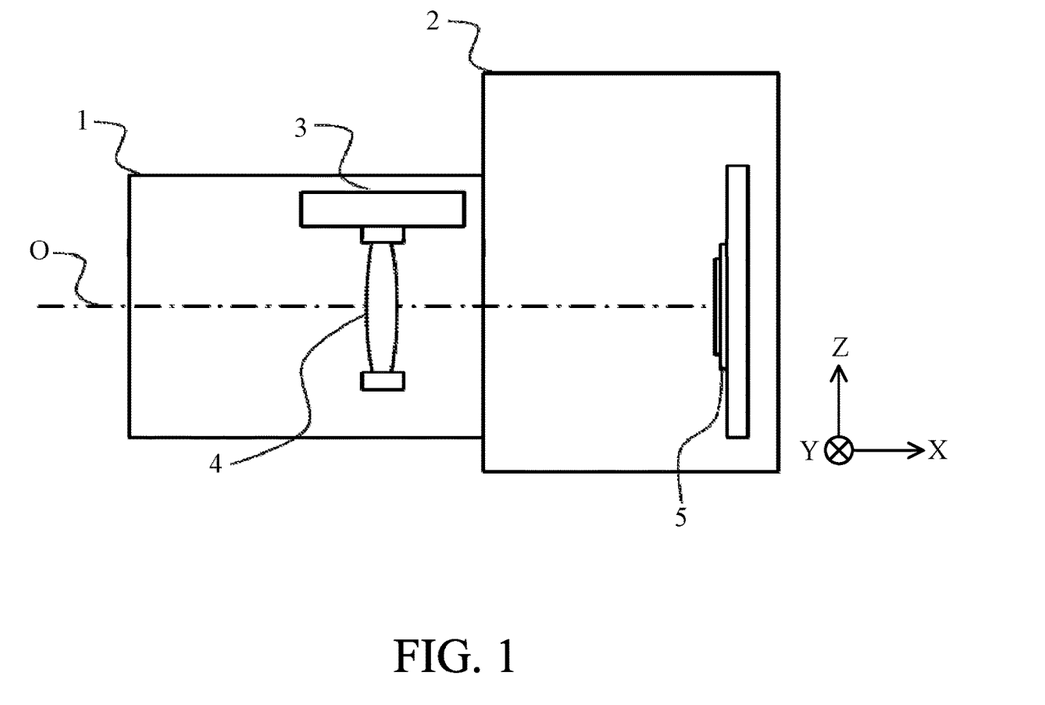
FIG. 1 is a sectional view of an image pickup apparatus including a vibration-wave motor according to an embodiment of the present invention.

FIG. 1 is a sectional view of an image pickup apparatus, which is an electronic apparatus including a vibration-wave motor (ultrasonic motor) according to an embodiment of the present invention. The image pickup apparatus according to this embodiment includes an imaging lens 1 and a camera body 2. Inside the imaging lens 1, a vibration-wave motor 3 and a focusing lens 4 attached to the vibration-wave motor 3 are arranged. Inside the camera body 2, an image pickup element 5 is arranged. The focusing lens 4 moves in parallel with an optical axis O (X-axis) by the vibration-wave motor 3 while capturing images. An object image is formed at a position of the image pickup element 5, and the image pickup element 5 generates a focused image. In this embodiment, the vibration-wave motor 3 is mounted on the image pickup apparatus, but the present invention is not limited to this. The vibration-wave motor 3 may be mounted on the electronic apparatus different from the image pickup apparatus, for example, a lens barrel detachably attached to an image pickup apparatus. The vibration-wave motor 3 is also used to move the focusing lens 4 in parallel with the optical axis O, but may be used to move an image blur correction lens in a direction orthogonal to the optical axis O. Moreover, the imaging lens 1 is integrated with the camera body 2 in this embodiment, but may be a lens detachably attached to the camera body 2.

Figure 2A:
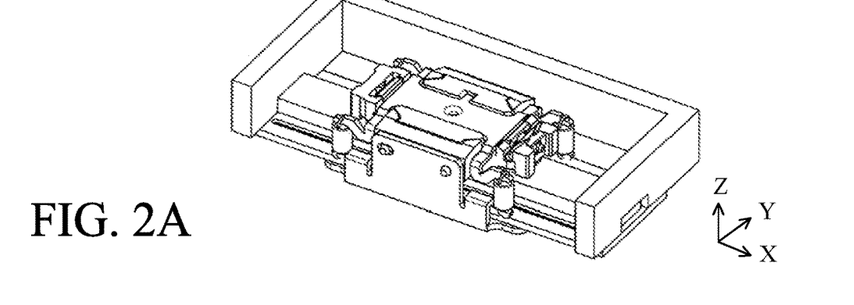
FIGS. 2A to 2D illustrate a structure of the vibration-wave motor.
Figure 2B:
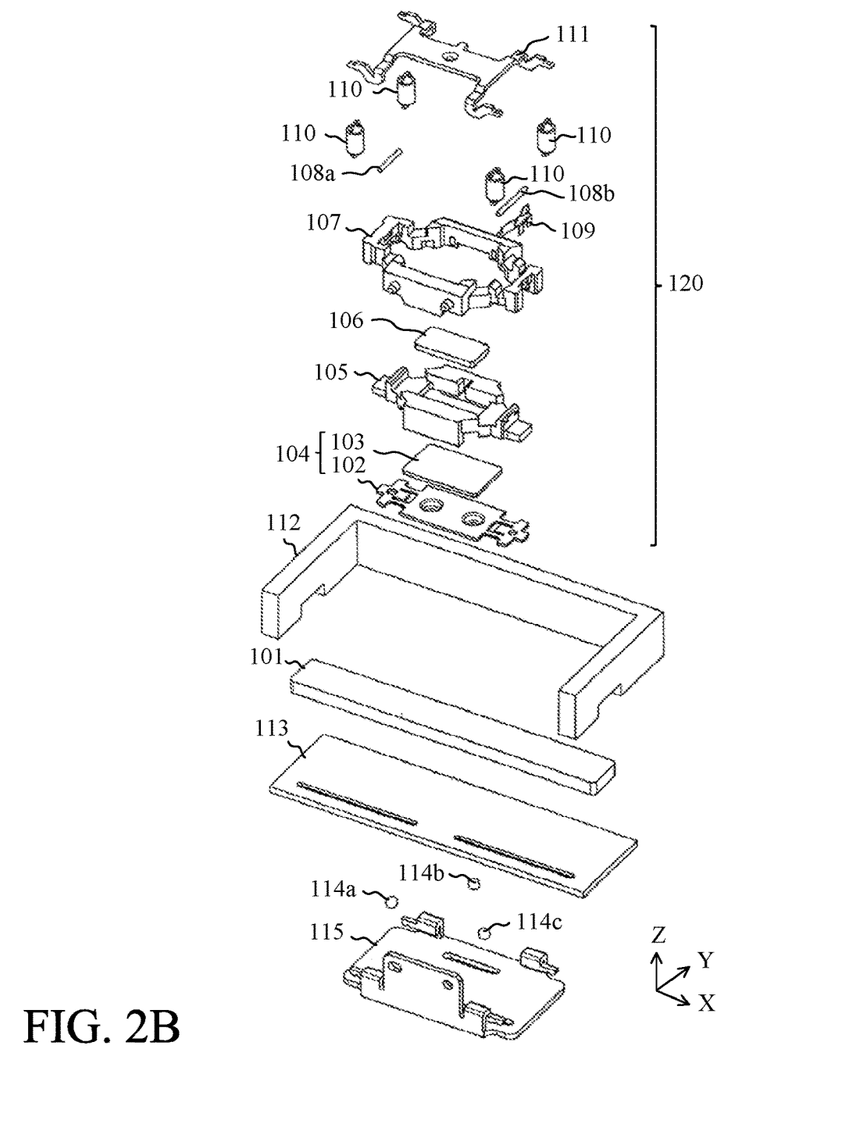
Figure 2C:
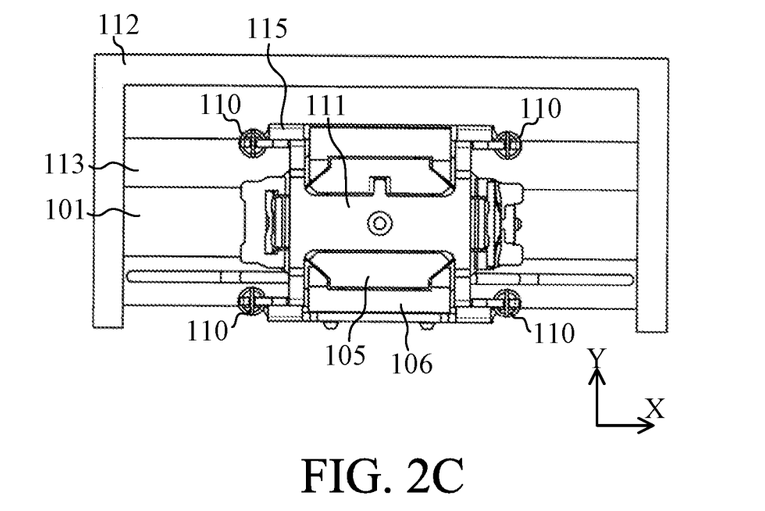
Figure 2D:
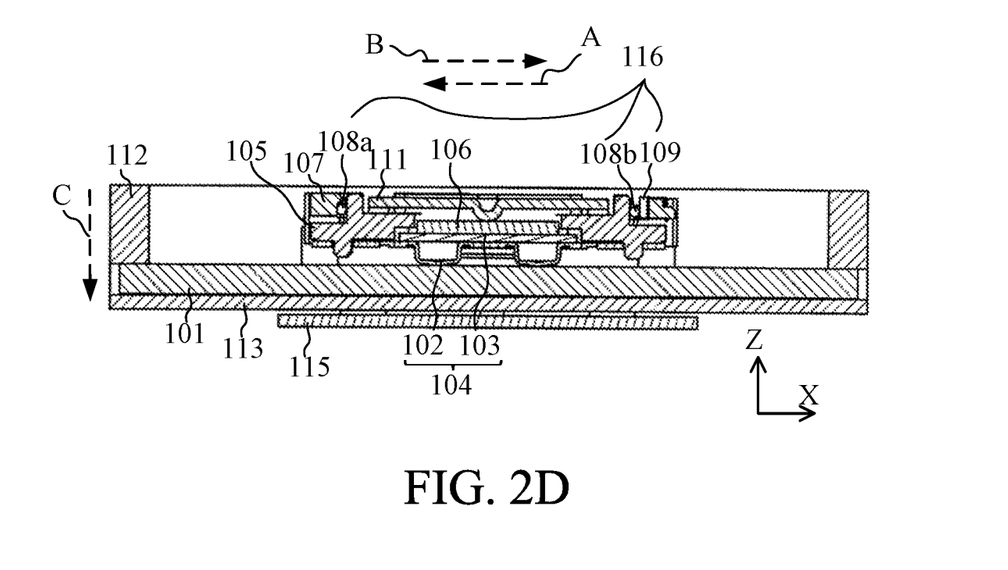
Figure 3A:
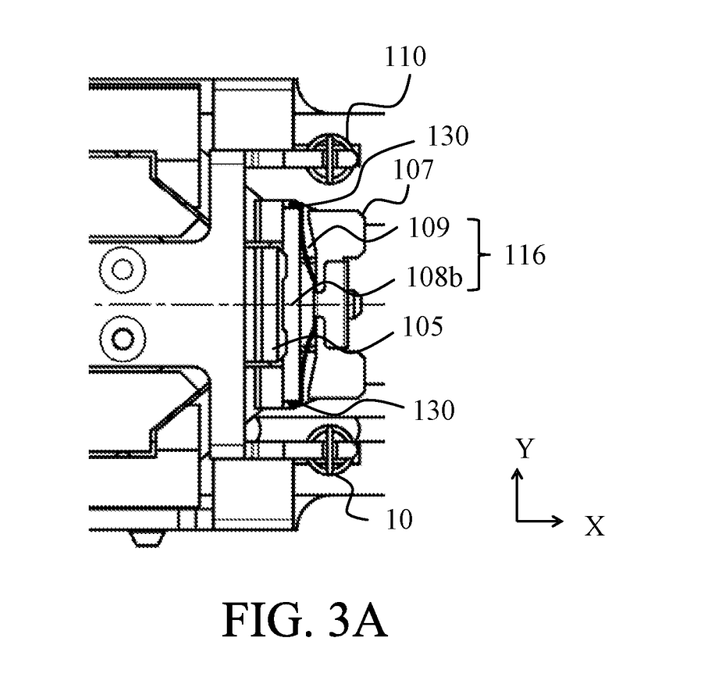
FIGS. 3A and 3B are partial enlarged views of the vibration-wave motor.
Figure 3B:
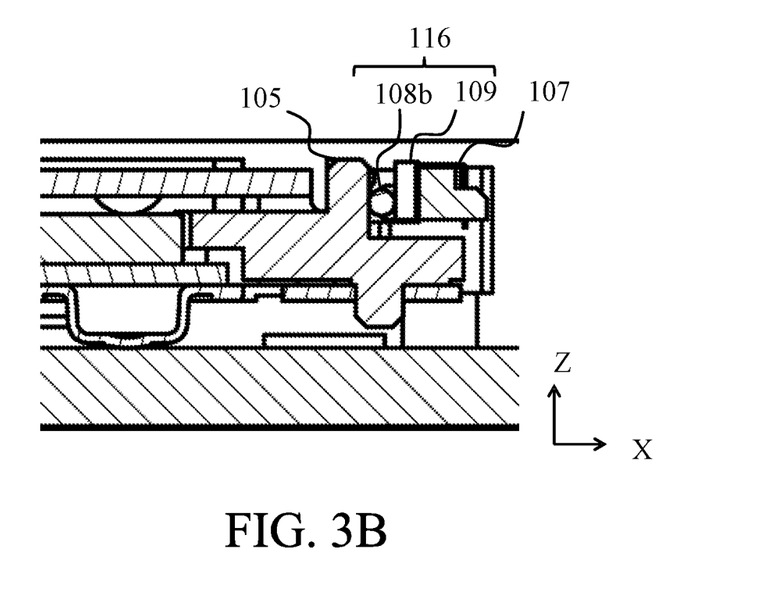

FIGS. 2A to 2D illustrate a structure of the vibration-wave motor 3. FIGS. 2A to 2D are a perspective view, an exploded perspective view, a front view, and a side surface sectional view of the vibration-wave motor 3, respectively. FIGS. 3A and 3B are partial enlarged views of the vibration-wave motor 3. FIG. 3A is a partial enlarged view of FIG. 2C, and FIG. 3B is a partial enlarged view of FIG. 2D.

A friction member (contacting member) 101 and a guide supporting member (rail plate) 113 are fixed to a base plate (base) 112 with screws. Four pressing springs (pressing members) 110 each are coupled to a pressing force transmission member (transmission member) 111 and a driving force transmission member (movable plate) 115 through spring hooking parts provided in the pressing force transmission member 111 and the driving force transmission member 115, and apply pressing force so that a vibrator 104 comes into frictional contact with the friction member 101. In this embodiment, the pressing springs 110 press the vibrator 104 at four positions, but the present invention is not limited to this as long as a plurality of pressing members can press the vibrator 104 at different positions. Additionally, the pressing force by the pressing springs 110 is orthogonal to a relative moving direction of a moving part 120 described below.

The vibrator 104 includes a vibration plate 102, and a piezoelectric element 103. The vibration plate 102 is fixed to the piezoelectric element 103 by an adhesive. The vibration plate 102 includes a contacting part, which is a protrusion part provided on a surface opposite to a surface on the pressing force transmission member 111 side, and the contacting part contacts the friction member 101 while being pressed by the pressing force of the pressing springs 110. The piezoelectric element 103 excites ultrasonic vibration by being applied with a voltage. when the piezoelectric element 103, which is adhered to the vibration plate 102, excites the ultrasonic vibration, a resonance phenomenon occurs in the vibrator 104. Then, two types of standing waves are caused in the vibrator 104, and thus an approximately elliptical motion is generated on the contacting part of the vibrator 102.

A vibrator holding member (first holding member) 105 holds the vibrator 104 by an adhesive. A pressing mechanism holding member (second holding member) 107, which is a holding housing to hold the pressing force transmission member 111, is coupled to the vibrator holding member 105 through cylindrical rollers (rolling members) 108a and 108b and a leaf spring (urging member) 109. The pressing mechanism holding member 107 includes a power output part (not illustrated) coupled to a driven body.

An elastic member 106 is disposed between the piezoelectric element 103 and the pressing force transmission member 111. The elastic member 106 prevents a pressing part provided on the pressing force transmission member 111 from directly contacting the piezoelectric member 103 to avoid damage of the piezoelectric element 103.

The pressing mechanism holding member 107 and the movable plate 115 are fixed by screws. On the movable plate 115, three V-groove moving side guiding parts are formed, and rolling balls 114a to 114c are respectively fitted in each of the moving guiding parts. On the rail plate 113, three groove-shape fixed side guiding parts are formed. The rolling balls 114a to 114c are sandwiched between the moving side guiding part formed on the movable plate 115 and the fixed side guiding part formed on the rail plate 113. In this embodiment, of three fixed side guiding parts formed on the rail plate 113, two are V-grooves and one is a plane groove having a bottom, but they may be grooves enabling the rolling balls 114a to 114c to roll.

In this embodiment, to thin the vibration-wave motor 3 in the z-axis direction, the pressing springs 110 are arranged separately to surround the vibrator 104 instead of being stacked on an upper part of the vibrator 104. In this embodiment, as the pressing force by the plurality of pressing springs 110 is generated, the pressing springs 110 can be miniaturized. When the pressing springs 110 press the vibrator 104 to the friction member 101 in a direction (a direction of pressing force or a pressing direction) of an arrow C through the elastic member 106, the contacting part of the vibration plate 102 contacts the friction member 101 while being pressurized by the pressing force of the pressing springs 110. When a voltage is applied to the piezoelectric element 103 in this state, the approximately elliptical motion generated in the vibrator 104 is effectively transmitted to the friction member 101. Then, the moving part 120, which includes the vibrator 104, the vibrator holding member 105, the elastic member 106, the pressing mechanism holding member 107, the pressing springs 110, the pressing force transmission member 111, and the movable plate 115, is movable in parallel with the optical axis O (x-axis) with respect to the friction member 101.

Next, a description will be given of a coupling member 116 coupling the vibrator holding member 105 and the pressing mechanism holding member 107. The coupling member 116 includes the rollers 108a and 108b and the leaf spring 109. As illustrated in FIGS. 2A to 2D, and FIGS. 3A and 3B, the rollers 108a and 108b are disposed between the vibrator holding member 105 and the pressing mechanism holding member 107 to be movable along the Z-axis. The leaf spring 109 is disposed between the pressing mechanism holding member 107 and the roller (second rolling member) 108b, and has urging force parallel to the X-axis. The leaf spring 109 urges the vibrator holding member 105 in a direction of an arrow A through the roller 108b, and urges the pressing mechanism holding member 107 in a direction of an arrow B. Whereby, the roller (first rolling member) 108a is sandwiched between the vibrator holding member 105 and the pressing mechanism holding member 107.

With such a structure, the vibrator holding member 105 and the pressing mechanism holding member 107 are movable along the Z-axis by rolls of the rollers 108a and 108b. Thus, the vibrator holding member 105 and the pressing mechanism holding member 107 can be coupled without hindering the ultrasonic vibrations generated in the vibrator 104. As the vibrator holding member 105 and the pressing mechanism holding member 107 can be also coupled without any backlash in the direction parallel to the X-axis, that is, the moving direction of the moving part 120, delay of response due to the backlash is prevented. As a result, driving efficiency can be improved.

Moreover, the urging force by the leaf spring 109 is set to be larger than inertial force by acceleration and deceleration generated in starting and stopping drive of the vibrator 104. Whereby, a relative displacement along the moving direction of the moving part 120 due to the inertial force during driving is not generated in the vibrator 104 and the vibrator holding member 105, and thus stable driving control can be realized.

In this embodiment, the coupling member 116 includes the rollers 108a and 108b and the leaf spring 109, but the present invention is not limited to this as long as the coupling member 116 includes the rolling member and the urging member. For example, balls may be used instead of rollers. Additionally, the coupling member 116 includes the leaf spring 109 as the elastic member in this embodiment, but may include the urging member capable of eliminating the backlash between the vibrator holding member 105 and the pressing mechanism holding member 107.

Hereinafter, a description will be given of miniaturization of an external size of the vibration-wave motor 3 in the X-Y plane. To realize miniaturization of the external size of the vibration-wave motor 3 in the X-Y plane, the plurality of pressing springs 110 need to be disposed to be close to a center of the vibrator 104 positioned on an intersection point of the X-axis and the Y-axis. However, the coupling member 116 is provided with a falling prevention structure of the rollers 108a and 108b, and the leaf spring 109 need to be enlarged to some extent to have the urging force of the above magnitude. Thus, the coupling member 116 enlarges. As a result, miniaturizing the external size of the vibration-wave motor 3 in the X-Y plane cannot be realized.

Next, a description will be given of a positional relation between the leaf spring 109 and the rollers 108a and 108b. In the following description, a side approaching a center of the vibrator 104 in the X-axis direction is referred to as a "center side", and a side separating from the center of the vibrator 104, that is, a side opposite to the center side is referred to as an "external side". When the vibrator holding member 105 holds the leaf spring 109 in its outline, the coupling member 116 enlarges to prevent interference with other components disposed to be stacked on the center part of the vibrator 104. Moreover, when the vibrator holding member 105 holds the leaf spring 109 outside its outline, the leaf spring 109 is arranged outside the outline of the vibrator holding member 105 and thus assembling the pressing mechanism holding member 107 cannot be performed.

In this embodiment, the pressing mechanism holding member 107 holds the leaf spring 109 to miniaturize the external size of the vibration-wave motor 3 in the X-Y plane. Moreover, the roller 108a abuts against the vibrator holding member 105 on the center side, and abuts against the pressing mechanism holding member 107 on the external side. The roller 108b abuts against the vibrator holding member 105 on the center side, and abuts against the leaf spring 109 held by the pressing mechanism holding member 107 on the external side. The pressing mechanism holding member 107 holds the leaf spring 109, and thus interference with other components, such as the piezoelectric element 103, the elastic member 106 and the pressing force transmission member 111, disposed to be stacked on the center part of the vibrator 104 can be avoided without impairing assemblability. Accordingly, the plurality of springs 110 can be disposed to be closer to the center part of the vibrator 104, and the external size of the moving part 120 in the X-Y plane can be miniaturized.

Additionally, the coupling member 116 need to be provided with the falling prevention structure to prevent fall of the rollers 108a and 108b. In this embodiment, the vibrator holding member 105 and the pressing mechanism holding member 107 are provided with the falling prevention structure to prevent fall of the rollers 108a and 108b in the direction of the arrow C. In addition, as a length of the roller 108a in the Y-axis direction can be shortened, the pressing mechanism holding member 107 can be provided with the falling prevention structure to prevent fall of the rollers 108a and 108b in the Y-axis direction. Meanwhile, as the leaf spring 109 is formed to have the urging force of the above magnitude, a length of the roller 108b, which abuts against the leaf spring 109, in the Y-axis direction, cannot be shortened. Thus, when the pressing mechanism holding member 107 is provided with the falling prevention structure to prevent the fall of the roller 108b in the Y-axis direction, the external size in the X-Y plane of the vibration-wave motor 3 enlarges. Accordingly, in this embodiment, the leaf spring 109 includes a falling prevention part 130 as the falling prevention structure to prevent the fall of the roller 108b in the Y-axis direction. Such a structure can further miniaturize the external size of the vibration-wave motor 3 in the X-Y plane. In this embodiment, as illustrated in FIG. 3A, the falling prevention part 130 is provided by folding both ends of the leaf spring 109, but the present invention is not limited to this as long as the fall of the roller 108b in the Y-axis direction can be prevented.

As mentioned above, this embodiment can provide the vibration-wave motor capable of realizing improvement of the driving efficiency and miniaturization.

Figure 4A:
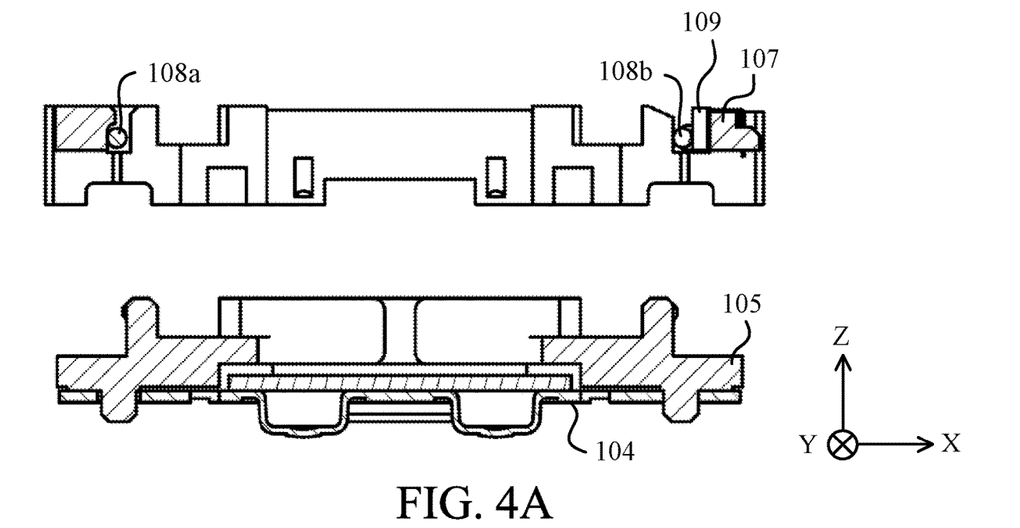
FIGS. 4A to 4D are explanatory diagrams of assembly of main components.
Figure 4B:
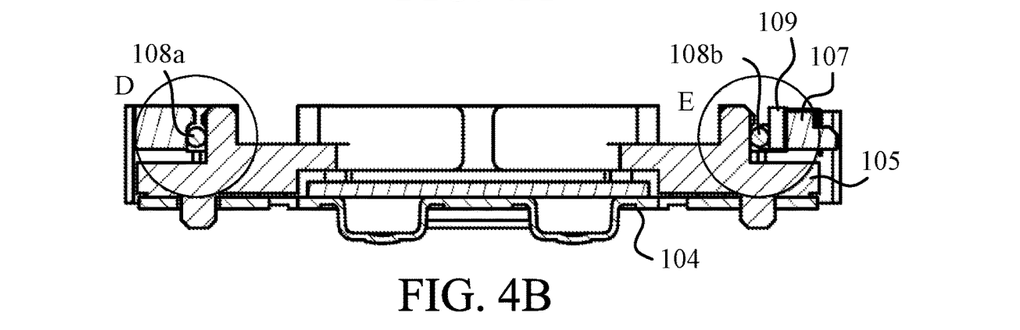
Figure 4C:
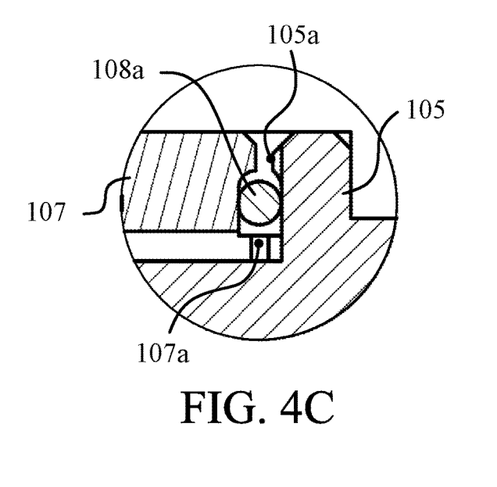
Figure 4D:
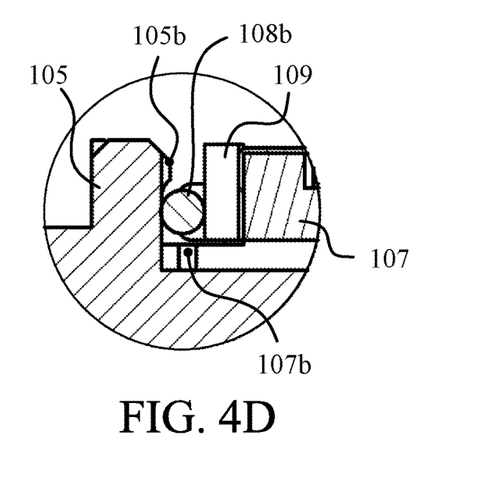

Next, referring to FIGS. 4A to 4D, a description will be given of assembly of the vibration holding member 105 and the pressing mechanism holding member 107. FIGS. 4A to 4D are explanatory diagrams of assembly of the vibration holding member 105 and the pressing mechanism holding member 107. FIG. 4A is a side surface sectional view before assembly, and FIG. 4B is a side surface sectional view after assembly. FIGS. 4C and 4D are enlarged views of regions D and E of FIG. 4B, respectively. As illustrated in FIG. 4A, before assembly, the vibrator 104 is assembled to the vibrator holding member 105. The rollers 108a and 108b and the leaf spring 109 are also assembled to the pressing mechanism holding member 107.

First, a description will be given of the falling prevention structure (stopping structure) of the rollers 108a and 108b. As illustrated in FIG. 4C, when moving in a positive direction of the Z-axis by a constant quantity, the roller 108a abuts against a stopping part 105a provided on the vibrator holding member 105 so that the movement of the roller 108a is restricted. Moreover, when moving in a negative direction of the Z-axis by a constant quantity, the roller 108a abuts against a stopping part 107a provided on the pressing mechanism holding member 107 so that the movement of the roller 108a is restricted. Such a structure prevents the fall of the roller 108a.

As illustrated in FIG. 4D, when moving in the positive direction of the Z-axis by a constant quantity, the roller 108b abuts against a stopping part 105b provided on the vibrator holding member 105 so that the movement of the roller 108b is restricted. Moreover, when moving in the negative direction of the Z-axis by a constant quantity, the roller 108b abuts against a stopping part 107b provided on the pressing mechanism holding member 107 so that the movement of the roller 108b is restricted. Such a structure prevents the fall of the roller 108b.

Thus, the stopping parts 105a and 105b prevent the fall of the rollers 108a and 108b to an assembling direction side of the vibrator holding member 105 with respect to the pressing mechanism holding member 107. The stopping parts 107a and 107b also prevent the fall of the rollers 108a and 108b to an assembling direction side of the pressing mechanism holding member 107 with respect to the vibrator holding member 105. In other words, a stopping part provided on one member of the vibrator holding member 105 and the pressing mechanism holding member 107 prevents the fall of the rollers 108a and 108b to the assembling direction side of the one member with respect to the other member.

Second, a description will be given of a stopping structure of the vibrator holding member 105 and the pressing mechanism holding member 107. In the state of FIG. 4B, it is assumed that the vibrator holding member 105 is relatively pulled out in the negative direction of the Z-axis with respect to the pressing mechanism holding member 107. Then, when the vibrator holding member 105 moves in the negative direction of the Z-axis by a constant quantity, the stopping parts 105a and 105b of the vibrator holding member 105 abut against the rollers 108a and 108b, respectively. After that, the vibrator holding member 105 moves in the negative direction of the Z-axis while drugging the rollers 108a and 108b. In this state, when the vibrator holding member 105 further moves by a constant quantity, the stopping parts 105a and 105b respectively abut against the stopping parts 107a and 107b of the pressing mechanism holding member 107 through the rollers 108a and 108b. As a result, the movement of the vibrator holding member 105 is restricted.

Moreover, in the state of FIG. 4B, it is assumed that the pressing mechanism holding member 107 is relatively pulled out in the positive direction of the Z-axis with respect to the vibrator holding member 105. Then, when the pressing mechanism holding member 107 moves in the positive direction of the Z-axis by a constant quantity, the stopping parts 107a and 107b of the pressing mechanism holding member 107 abut against the rollers 108a and 108b, respectively. After that, the pressing mechanism holding member 107 moves in the positive direction of the Z-axis while drugging the rollers 108a and 108b. In this state, when the pressing mechanism holding member 107 further moves by a constant quantity, the stopping parts 107a and 107b respectively abut against the stopping parts 105a and 105b of the vibrator holding member 105 through the rollers 108a and 108b. As a result, the movement of the pressing mechanism holding member 107 is restricted.

As mentioned above, each stopping part of the vibrator holding member 105 and the pressing mechanism holding member 107 is formed so that at least part of it overlaps with the rollers 108a and 108b when viewed from the Z-axis direction. With such a structure, in this embodiment, each stopping part of the vibrator holding member 105 and the pressing mechanism holding member 107 prevents the fall of the rollers 108a and 108b and the fall of the vibrator holding member 105 and the pressing mechanism holding member 107.

Additionally, of the stopping parts 105a and 105b, a positive side of the Z-axis is chamfered at an angle of 45 degrees, and a negative side of the Z-axis is in ere in curved surface. When the pressing mechanism holding member 107 where the rollers 108a and 108b are assembled is assembled to the vibrator holding member 105 from the positive direction of the Z-axis, the stopping parts 105a and 105b each push away the rollers 108a and 108b in the X-axis direction. Then, the leaf spring 109 elastically deforms in the X-axis direction to evacuate from the stopping part 105b. Accordingly, the roller 108b can override the stopping part 105b.

Figure 5A:
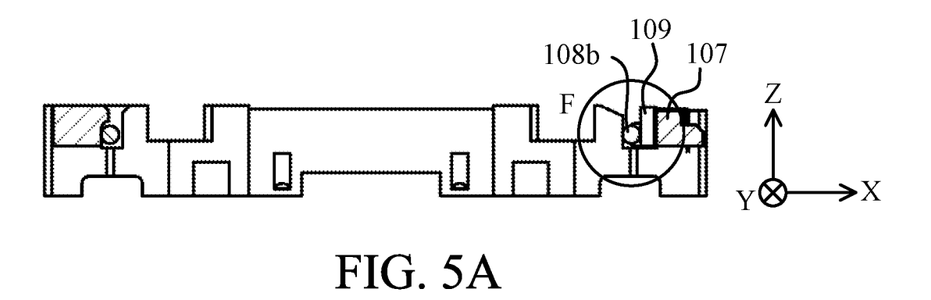
FIGS. 5A to 5B are explanatory diagrams of structures of the main components.
Figure 5B:
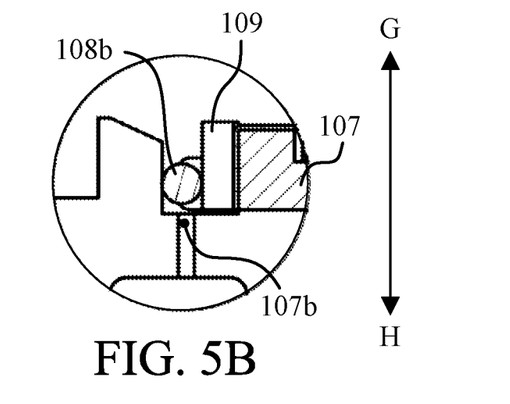

Next, a description will be given of the structure of the stopping part. FIG. 5A illustrates a side surface sectional view of the pressing mechanism holding member 107 where the rollers 108a and 108b and the leaf spring 109 are assembled. FIG. 5B is an enlarged view of a region F of FIG. 5A.

As illustrated in FIG. 5B, the stopping part 107b of the pressing mechanism holding member 107 is provided on the negative side (a side of an arrow H) of the Z-axis. The leaf spring 109 is assembled to the pressing mechanism holding member 107 from a side (the positive side of the Z-axis, a side of an arrow G) opposite to a side where the stopping part 107b is provided. That is, the leaf spring 109 is held so that the leaf spring 109 and the stopping part 107b are arranged in this order along the assembling direction (negative direction of the Z-axis) of the pressing mechanism holding member 107. With such a structure, the leaf spring 109 and the stopping part 107b do not block with each other.

Figure 6:
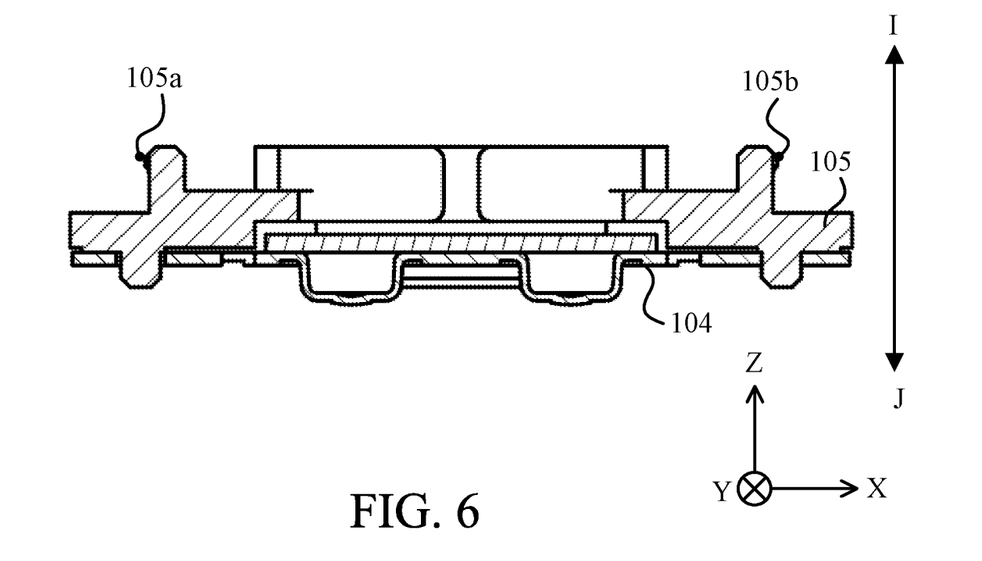
FIG. 6 is an explanatory diagram of the structures of the main components.

FIG. 6 is a side surface sectional view of the vibrator holding member 105 where the vibrator 104 is assembled. As illustrated in FIG. 6, the vibrator 104 is assembled from the negative side (side of an arrow J) of the Z-axis. The stopping parts 105a and 105b of the vibrator holding member 105 are provided on a side (the positive side of the Z-axis, a side of an arrow I) opposite to a side where the vibrator 104 is assembled. The vibrator holding member 105 is also assembled to the pressing mechanism holding member 107 on the positive side of the Z-axis. Accordingly, the positions of the vibrator 104, the vibrator holding member 105, and the pressing mechanism holding member 107 can be overlapped, and thus enlargement of a size in the X-axis direction can be prevented.

As mentioned above, the vibration-wave motor 3 according to this embodiment can prevent the fall of the rollers 108a and 108b, which are necessary for coupling, and the fall of the vibration holding member 105 and the pressing mechanism holding member 107 while coupling them without any backlash. Thus, enlargement of the whole size of the vibration-wave motor 3 can be suppressed.

In this embodiment, the leaf spring 109 is assembled to the pressing mechanism holding member 107, but may be assembled to the vibrator holding member 105. In this case, the leaf spring 109 is held so that the leaf spring 109 and each of the stopping parts 105a and 105b are arranged in this order along an assembling direction (the positive direction of the Z-axis) of the vibrator holding member 105.

In this embodiment, the vibration-wave motor 3 has the structure that the vibrator 104 moves and the friction member 101 does not move, but may has a structure that the vibrator 104 does not move and the friction member 101 moves. The vibration-wave motor 3 according to this embodiment includes the friction member 101 as an unmoved fixed part, but the vibrator 104 may contact with frictional contact with a member other than the vibration-wave motor 3, for example, part of a lens holding frame, and in this case, the vibration-wave motor 3 may not include the friction member 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2016-090598, filed on Apr. 28, 2016, and 2016-199106, filed on Oct. 7, 2016, which are hereby incorporated by reference herein in their entirety.

What is claimed is:

1. A motor comprising:
a vibrator;
a pressing member that presses the vibrator onto a contacting member in contact with the vibrator;
a transmission member that transmits pressing force by the pressing member to the vibrator;
a first holding member that holds the vibrator;
a second holding member that holds the transmission member; and
a coupling member that couples the first and second holding members,
wherein the vibrator and the contacting member move relatively by vibrations that occur in the vibrator, wherein the coupling member includes a rolling member that relatively moves the first and second holding members in a pressing direction of the pressing member, and an urging member that urges the first and second holding members in parallel with a relative moving direction of the vibrator and the contacting member, wherein the urging member is held by the second holding member, and wherein the rolling member is sandwiched between the first and second holding members, abuts against the first holding member on a center side of the vibrator in the relative moving direction of the vibrator and the contacting member, and abuts against the second holding member or the urging member on an opposite side to the center side of the vibrator.

2. The motor according to claim 1, wherein the urging member includes a falling prevention part to prevent fall of the rolling member.

3. The motor according to claim 1, wherein the plurality of pressing members are disposed separately to surround the vibrator.

4. The motor according to claim 1, wherein the pressing direction is orthogonal to the relative moving direction of the vibrator and the contacting member.

5. The motor according to claim 1, wherein urging force by the urging member is larger than inertial force applied to the first holding member when the vibrator and the contacting member relatively move.

6. The motor according to claim 1, wherein the rolling member includes a first rolling member that abuts against the first holding member on the center side of the vibrator and that abuts against the second holding member on an opposite side to the center side of the vibrator, and a second rolling member that abuts against the first holding member on the center side of the vibrator and that abuts against the urging member on the opposite side.

7. The motor according to claim 6, wherein a length of the first rolling member is shorter than a length of the second rolling member.

8. The motor according to claim 1, wherein the urging member is a leaf spring.

9. The motor according to claim 1, wherein the rolling member is a cylindrical roller.

10. The motor according to claim 1, wherein the vibrator includes a vibration plate that contacts the contacting member, and a piezoelectric element that excites ultrasonic vibration by being applied with a voltage.

11. The motor according to claim 1,
wherein the first holding member includes a first stopping member that prevents fall of the rolling member,
wherein the second holding member includes a second stopping member that prevents fall of the rolling member,
wherein the first stopping part prevents the fall of rolling member to an assembling direction side of the first holding member with respect to the second holding member, and
wherein the second stopping part prevents the fall of the rolling member to an assembling direction of the second holding member with respect to the first holding member.

12. The motor according to claim 11, wherein the second holding member is assembled to the first holding member from a side where the second stopping part is provided.

13. The motor according to claim 11,
wherein the first stopping part is provided on an opposite side to a side where the vibrator is held, and
wherein the first holding member is assembled to the second holding member from a side where the first stopping part is provided.

14. The motor according to claim 11, wherein at least part of the first and second stopping parts overlap with the rolling member when viewed from the pressing direction.

15. An electronic apparatus comprising a motor,
wherein the motor includes:
a vibrator;
a pressing member that presses the vibrator onto a contacting member in contact with the vibrator;
a transmission member that transmits pressing force by the pressing member to the vibrator;
a first holding member that holds the vibrator;
a second holding member that holds the transmission member; and
a coupling member that couples the first and second holding members,
wherein the vibrator and the contacting member move relatively by vibrations that occur in the vibrator,
wherein the coupling member includes a rolling member that relatively moves the first and second holding members in a pressing direction of the pressing member, and an urging member that urges the first and second holding members in parallel with a relative moving direction of the vibrator and the contacting member,
wherein the urging member is held by the second holding member, and
wherein the rolling member is sandwiched between the first and second holding members, abuts against the first holding member on a center side of the vibrator in the relative moving direction of the vibrator and the contacting member, and abuts against the second holding member or the urging member on an opposite side to the center side of the vibrator.

16. A lens barrel comprising:
a motor; and
a lens,
wherein
the motor comprises:
a vibrator;
a pressing member that presses the vibrator onto a contacting member in contact with the vibrator;
a transmission member that transmits pressing force by the pressing member to the vibrator;
a first holding member that holds the vibrator;
a second holding member that holds the transmission member; and
a coupling member that couples the first and second holding members,
wherein the vibrator and the contacting member move relatively by vibrations that occur in the vibrator,
wherein the coupling member includes a rolling member that relatively moves the first and second holding members in a pressing direction of the pressing member, and an urging member that urges the first and second holding members in parallel with a relative moving direction of the vibrator and the contacting member,
wherein the urging member is held by the second holding member, and
wherein the rolling member is sandwiched between the first and second holding members, and abuts against the first holding member on a center side of the vibrator in the relative moving direction of the vibrator and the contacting member and abuts against the second holding member or the urging member on an opposite side to the center side of the vibrator, and wherein the lens moves in parallel with an optical axis of the lens or in a direction orthogonal to the optical axis by relative moving of the vibrator and the contacting member.

17. The lens barrel according to claim 16,
wherein the lens barrel is detachably attached to an image pickup apparatus.

18. An image pickup apparatus comprising a lens barrel according to claim 16.

* * * * *